United States Patent [19]
Tatebayashi et al.

[11] Patent Number: 6,028,937
[45] Date of Patent: *Feb. 22, 2000

[54] COMMUNICATION DEVICE WHICH PERFORMS TWO-WAY ENCRYPTION AUTHENTICATION IN CHALLENGE RESPONSE FORMAT

[75] Inventors: Makoto Tatebayashi, Takarazuka; Natsume Matsuzaki, Minou; Syunji Harada; Motoji Omori, both of Osaka; Masayuki Kozuka; Kazuhiko Yamauchi, both of Neyagawa, all of Japan

[73] Assignee: Matsushita Electric Industrial Co., Ltd, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/728,151

[22] Filed: Oct. 9, 1996

[30] Foreign Application Priority Data

Oct. 9, 1995 [JP] Japan ................................. 7-261241

[51] Int. Cl.[7] ............................................. H04L 9/00
[52] U.S. Cl. ............................................................ 380/25
[58] Field of Search ................................ 380/21, 23, 25

[56] References Cited

U.S. PATENT DOCUMENTS

| | | | |
|---|---|---|---|
| 5,311,596 | 5/1994 | Scott et al. | 380/23 |
| 5,371,794 | 12/1994 | Diffie et al. | 380/21 |
| 5,457,746 | 10/1995 | Dolphin | 380/25 |
| 5,491,750 | 2/1996 | Bellare et al. | 380/25 |
| 5,534,857 | 7/1996 | Laing et al. | 380/23 |
| 5,797,916 | 5/1998 | MacDoran et al. | 380/25 |

OTHER PUBLICATIONS

"BBC–Datacast–Conditional Access Operation," Bradshaw et al., Conference on Electronic Delivery of Data and Software (Publ. No. 69), London, UK, Sep. 16–17, 1986, pp. 99–105.

"Comparing the Security of Pay–TV Systems in an Australian Context," by L. Brown, Australian Telecommunication Research 1990, Australia, vol. 24, No. 2, pp 1–8.

"Entity Authentication and Key Distribution," Bellare et al., Advances in Cryptology (Crypto), Santa Barbara, Aug. 22–26, 1993, No. Conf. 13, Aug. 22, 1993, pp 232–249.

"Authentication and Authenticated Key Exchanges," by W. Diffie et al., Designs, Codes and Cryptography, vol. 2, No. 2, Jun. 1, 1992, pp. 107–125.

"Fully–Fledged Two–Way Public Key Authentication and Key Agreement for Low–Cost Terminals," Beller et al., Electronic Letters, vol. 29, No. 11, May 27, 1993, pp. 999–1001.

Primary Examiner—Salvatore Cangialosi
Attorney, Agent, or Firm—Price, Gess & Ubell

[57] ABSTRACT

A supplier device 70 which supplies title data is equipped with a encryption module 74 for performing an encryption which is substitutive in nature and the user device 90 which uses the title data is equipped with a decryption module 93 for performing a decryption which corresponds to the encryption. The supplier device 70 uses this encryption module 74 to prove its own authorization and authenticate other devices. Similarly, the user device 90 uses this decryption module 93 to prove its own authorization and authenticate other devices.

22 Claims, 10 Drawing Sheets

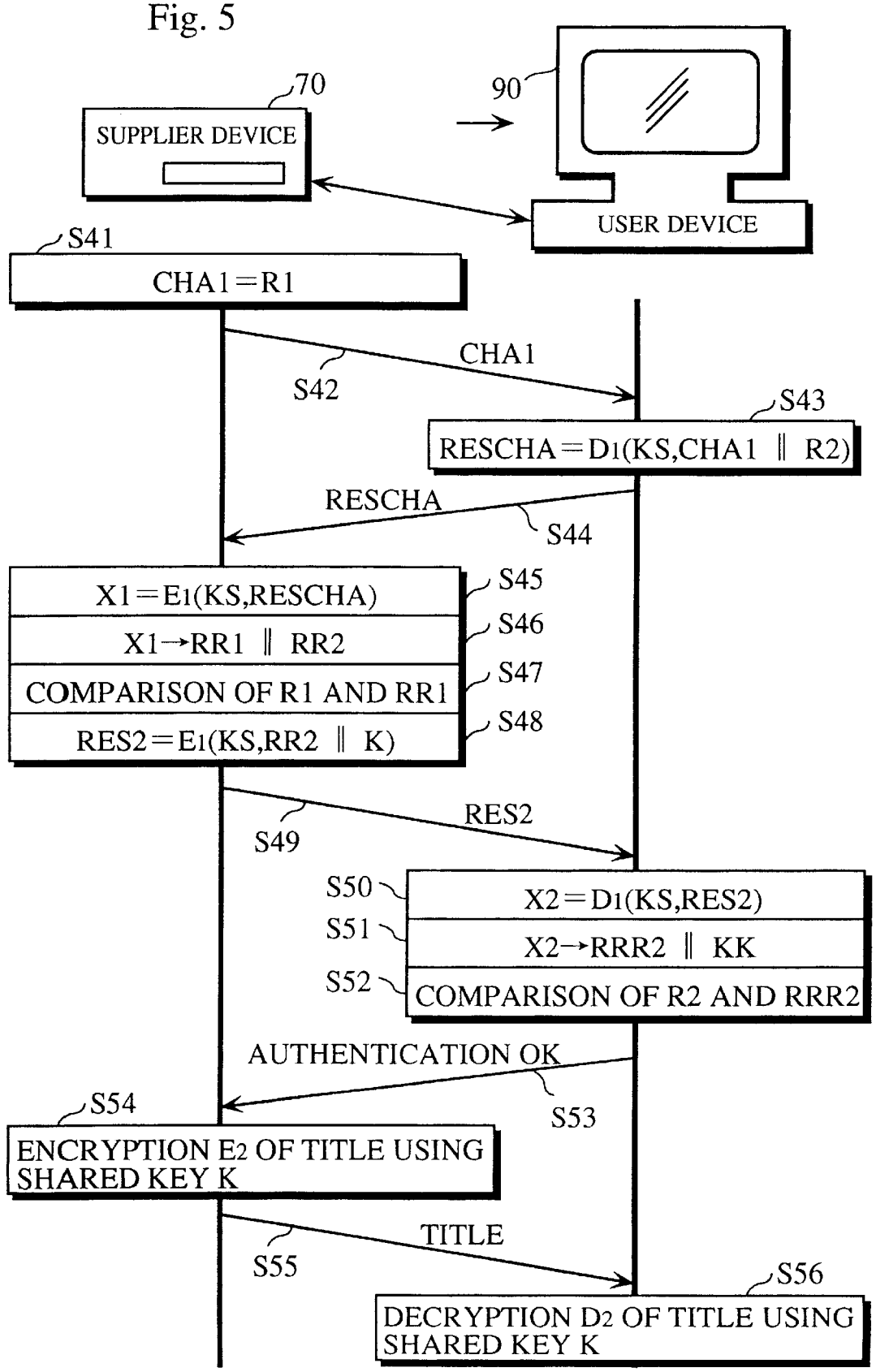

COMMUNICATION DEVICE WHICH PERFORMS TWO-WAY ENCRYPTION AUTHENTICATION IN CHALLENGE RESPONSE FORMAT

BACKGROUND OF THE INVENTION

1. Field of the Invention

The present invention relates to communication devices which authenticate each other using encryption before performing data communication.

2. Description of the Prior Art

When performing data communication, there are many instances when it is necessary to take protective measures against unauthorized copying or alteration of data.

In the example shown in FIG. 1, this relates to the optical disc reproduction device 10 reading a title such as a movie from the optical disc 13 and distributing a copy of the title via the network 11 to only the authorized movie reproduction device 12, at the same time preventing eavesdropping by unauthorized movie reproduction device 14.

Secret communication where two-way authentication is performed in "Challenge Response" format provides one method where data communication is restricted to the supply of data from communication devices which have the authority to distribute data (hereinafter referred to as supplier devices) to communication devices which are authorized to receive the data (hereinafter referred to as authorized user devices), with other communication devices being excluded from the communication. The procedure for this kind of communication can be broadly divided into the following two steps.

1. Authentication Step

Before executing data communication, both devices verify that the device with which they are in contact is an authorized device. This is performed to prevent unauthorized communication devices from becoming an authorized supplier device or an authorized user device.

This confirmation is performed using encryption and consists of three main procedures. First, a first device transmits challenge data to the second device. The second device then proves its authorization for this challenge data and replies using response data. Finally, the first device verifies this response data.

2. Secret Communication Step

Secret communication of the object data is only performed when the authentication has been achieved in the previous step. This is to prevent eavesdropping during data transfer by third communication device. An example of a conventional technique for performing secret communication with two-way authentication performed in "Challenge Response" format is a communication system standardized using International Organization for Standardization/ International Electrotechnical Commission (ISO/IEC) 97892-2.

FIG. 2 shows the communication sequence performed when an authorized supplier device 15 transmits a copy of a title in its possession to an authorized user device according to the above conventional technique. Here, steps S21 to S33 in the drawing correspond to the authentication step described above, with steps S34 to S36 corresponding to the aforementioned secret communication step. Each of those steps in the drawing are described in more detail below.

Steps S21, S22

First, the authorized supplier device 15 generates a random number R1 and transmits it to the authorized user device 16 as challenge data CHA1.

Steps S23, S24

On receiving the challenge data CHA1, the authorized user device 16 generates a random number R2 as challenge date for the supplier device 15, and links these two as the data CHA1∥R2. It then sets this linked data (CHA1∥R2) as plaintext and performs a first encryption $E_1$ according to the first encryption algorithm using an authentication key K1, which is provided beforehand only to authorized devices, as the encryption key. It then sends the resulting cryptogram $E_1$ (K1, CHA1∥R2) to the supplier device 15.

It should be noted here that this cryptogram RESCHA is both the response data in reply to the challenge data CHA1 sent from the supplier device 15 and the challenge data for the supplier device 15.

Step S25

On receiving this date RESCHA, the supplier device 15 sets it as a cryptogram and performs the first decryption $D_1$ according to the first encryption algorithm, using the authentication key K1, which is provided beforehand only to authorized devices, as the decryption key.

It should be noted here that the decryption $D_1$ is a reversal of the process in the encryption $E_1$ according to the first encryption algorithm.

Step S26

Next, the supplier device 15 performs a reversal of the process in step S23 for the result X1 of the decryption $D_1$, which is to say it performs separation to obtain separated data RR1 which corresponds to challenge data CHA1 and separated data RR2 which corresponds to random number R2.

Step S27

The supplier device 15 then compares the separated data RR1 with the random number R1 generated in step S22.

If, as a result, the numbers coincide, the supplier device 15 verifies that user device 16 is authorized. This is based on the observation that both devices are in possession of the authentication key K1 which is only known by authorized devices.

If, on the other hand, the numbers do not coincide, the supplier device 15 regards the user device 16 as not authorized and cancels the remaining processes.

Steps S26, S29

The supplier device 15, having authenticated the device with which it is in communication in the above steps, next moves onto generating a new random number K for use during secret communication and links this to separated data RR2. It then sets this linked data (RR2∥K) as plaintext end performs a first encryption $E_1$ according to a first encryption algorithm using a second authentication key K2, which is provided beforehand only to authorized devices, as the encryption key. It then sends the resulting cryptogram $E_1$ (K2, RR2∥K) to the user device 16.

It should be noted here that this cryptogram (RES2) serves as both the response data in reply to the challenge data RESCHA sent from the user device 16 and as the distribution of the shared key K for secret communication.

Step S30

On receiving this data RES2, the user device 16 sets it as a cryptogram and performs a decryption $D_1$ according to the first encryption algorithm using the second authentication key $K_2$ provided beforehand as the decryption key.

Step S31

Next, the user device 16 performs a reversal of the process in step S28 for the result X2 of the decryption $D_1$, which is to say it performs separation to obtain separated data RRR2 which corresponds to response data RR2 and separated data KK which corresponds to random number K.

Step S32

The user device 16 then compares the separated data RRR2 with the random number R2 generated in step S24.

If, as a result, the numbers coincide, the user device 16 confirms that supplier device 15 is authorized. This is based on the observation that both devices are in possession of the authentication key K2 which is only known by authorized devices. It should be noted here that when the separated data RRR2 and the random number coincide, the separated data KK will be equal to random number K.

If, on the other hand, the numbers do not coincide, the user device 16 regards the supplier device 15 as not authorized and cancels the remaining processes.

Step S33

On authenticating the supplier device 15 in the step given above, the user device 16 informs the supplier device 15 of this verification.

By doing so, the two-way authentication is positively completed at the same time as the provision of the shared key K for the following secret communication is completed.

Steps S34, S35

The supplier device 15 then sets a copy of the title as plaintext and performs encryption $E_2$ according to a second encryption algorithm using the shared key K as the encryption key, before transferring the encrypted title to user device 16.

Step S36

On receiving the encrypted title, the user device 16 sets it as a cryptogram and performs decryption $D_2$ according to the second encryption algorithm using the shared key K as the decryption key.

It should be noted here that the decryption $D_2$ is a reversal of the process in the encryption $E_2$ according to the second encryption algorithm.

By means of the above procedure, a copy of the title in the possession of the: authorized supplier device 15 can be distributed to the authorized user device 16, with eavesdropping by a third communication device during distribution being prevented.

However, there are the following drawbacks with the verification method described above.

(1) In order to perform two-way verification, both devices require large-scale logic circuits which prevent reductions in the size of the equipment.

In general, a more complex and hence more secure encryption algorithm is used in the authentication step than in the Secret communication step. Here, a title comprises a huge amount of data, so that while from the viewpoint of transfer time it is necessary to perform the encryption and decryption of the title in a short time, only a negligible amount of date is used by the challenge data and response data in comparison to the title data, so that there are no effective restrictions on the amount of data used. Moreover, it is more important that a complex encryption algorithm of high security be used in the authentication step in order to improve the overall security of data communication.

Here, in order to execute the authentication step, both devices need to be equipped with an encrypter for executing encryption $E_1$ and a decrypter for executing decryption $D_1$.

If it is supposed here that each of the encrypter and the decrypter is composed of a logic circuit which includes ten thousand gates, both devices will need to include logic circuits which include over twenty thousand gates in order execute two-way authentication. This makes the realization of compact, low-cost optical disc reproduction devices and image reproduction devices problematic.

(2) The secret management necessary for maintaining the security of two-way authentication is very difficult.

In order to maintain the security of two-way authentication, the encryption algorithm. In order to do so, it is necessary to provide an encrypter and a decrypter only to the authorized supplier device 15 and the authorized user device 16.

Here, for the aforementioned authentication method, the encrypter and the decrypter provided in the supplier device 15 are the same as those which are be provided in the user device 16. As a result, should an unauthorized communication device succeed in acquiring the encrypter and the decrypter provided in a supplier device 15, this unauthorized communication device can then be easily used as either a supplier device 15 or a user device 16. In the same way, should it succeed in acquiring the encrypter and the decrypter provided in a user device 16, this unauthorized communication device can then be easily used as either a user device 16 or a supplier device 15. This means that in order to maintain the security of two-way authentication, it is necessary for the encrypter and decrypter in both the supplier device 15 and the user device 16 to be protected at a same high level of security.

However, since there are generally far greater number of title users than title distributors, it is difficult to maintain complete security for the encrypters and decrypters used by all of the user devices 16. As a result, it is easy for unauthorized users to improperly obtain copies of titles or to improperly distribute them.

As one example, suppose "authorization" is set as "conforming to an established standard for optical discs". If in this case, the encrypter and the decrypter are supplied not only to the company which manufactures an optical disc reproduction device which conforms to this standard but also to a large number of companies which manufacture image reproduction devices which conform to the standard. Since it is necessary here to maintain the secrecy of the systems, such secrecy management is highly problematic.

SUMMARY OF THE INVENTION

In view of the stated problems, it in a primary object of the present invention to provide a two-way authentication device in challenge response format which can maintain a high level of security and which is more compact than conventional devices.

It is a secondary object of the present invention to provide a two-way authentication device in challenge response format which allows simple secrecy management for maintaining the security Of two-way authentication.

In order to achieve the above first and second objects, the supplier device is equipped with a first authentication key and a first encrypter, with these being used for both the verification of the authorization of other devices and the demonstration of the authorization of the present device. In the same way, a user device is equipped with a first authentication key and a decrypter, with these being used for both the verification of the authorization of other devices and the demonstration of the authorization of the present device. Here, the encrypter performs an encryption which is substitutive in nature and the decrypter performs the reverse converse of this encryption, with both devices being provided with the same authentication key.

The present invention is configured so that if the encrypter performs an encryption which is substitutive in nature, plaintext is returned to its original form not only if decryption is performed after first performing encryption but also if encryption is performed after first performing decryption.

Due to the above characteristic of the present invention, authentication of the user device by a supplier device, which has conventionally been executed by first having a user device perform encryption and a supplier device perform decryption, can be performed by a user device perform decryption and a supplier device perform encryption. By doing so, a supplier device need only comprise a single encrypter and a user device need only comprise a single decrypter to perform the same two-way authentication as conventional methods. This is to say, the present invention provides a two-way authentication device in challenge response format which is more compact than conventional devices but which suffers from no lose of security.

Unlike conventional systems, in the present invention the components (encrypter and authentication key) in the supplier device which need to be kept secret are different to the components (decrypter and authentication key) in the user device which need to be kept secret, which means that it is easier to maintain a high level of security for the two-way authentication. This is to say, should an unauthorized communication device obtain the decrypter and authentication key, while such communication device may be used as a user device it cannot be used as a supplier device. This means that by maintaining an extremely high level of security for secrecy management of the encrypter and authentication key in the supplier device, the most serious violation of security, which in the use of an unauthorized communication device as a supplier device, can be avoided.

It is possible for the authentication key and the encrypter in the supplier device to be combined in a single IC chip and for the authentication key and the decrypter in the user device to be combined in a single IC chip. By doing so, it is very difficult to decode the encryption algorithm and authentication key using a unauthorized communication device, which improves the security of two-way authentication and makes secrecy management simple.

It is also possible to equip the supplier device and user device with a common second authentication key and second encrypter, in addition to the aforementioned encrypter and decrypter, for two-way authentication. This is to say, the supplier device uses not only the first encrypter but also this second encrypter for both the verification of the authorization of other devices and the demonstration of the authorization of the present device. In the same way, the user device uses not only the decrypter but also this second encrypter for both the verification of the authorization of other devices and the demonstration of the authorization of the present device. By doing so, the security of the two-way authorization can be improved and, by having secrecy management performed for this pair of second authentication keys and second encrypters, secrecy management can be performed simultaneously for both devices.

BRIEF DESCRIPTION OF THE DRAWINGS

These and other objects, advantages and features of the invention will become apparent from the following description taken in conjunction with the accompanying drawings which illustrate a specific embodiment of the invention. In the drawings:

FIG. 5 shows the communication sequence when transferring a copy of a title in the possession of a supplier device to a user device, according to the present embodiment of the present invention;

DESCRIPTION OF THE PREFERRED
EMBODIMENTS

First Embodiment

Figure 3:
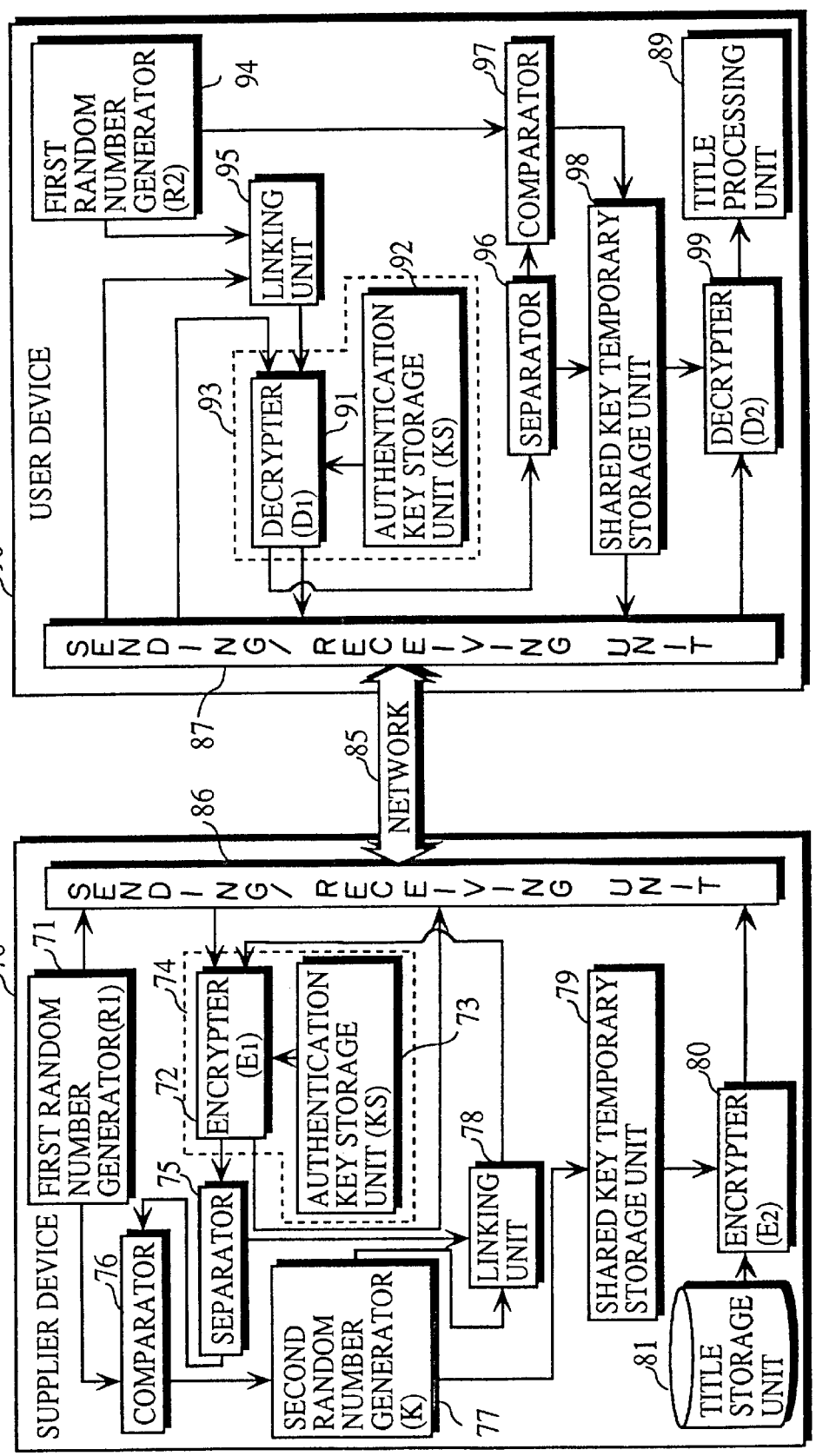
FIG. 3 is a block diagram showing the composition of the two-way authentication system in challenge response format to which the first embodiment of the present invention relates.

A block diagram showing the composition of the two-way authentication system in challenge response format to which the first embodiment of the present invention relates is shown in FIG. 3.

This system is composed of a supplier device 70 and a user device 90 which are connected via a network 85.

The supplier device 70 is a communication device for supplying a copy of a title for which it holds the rights to an authorized user device 90, and is made up of sending/receiving unit 86, construction elements for principally performing the authentication step (these being a first random number generator 71, a encryption module 74, a separator 75, a comparator 76, a second random number generator 77 and a linking unit 78) and construction elements for principally performing the secret communication step (these being a shared key temporary storage unit 79, an encrypter 80 and a title storage unit 81). The operation timing of these construction elements is controlled by a system controller which is not illustrated.

The sending/receiving unit 86 is made up of a signal level transformer or the like and executes the both data transmission to the network 85 and data reception from the network 85.

The first random number generator 71 generates a 32-bit random number as the challenge data for the user device 90.

The encryption module 74 is a single IC chip which performs the encryption for the authentication step, and includes an encrypter 72 for performing encryption $E_1$ using a first encryption algorithm and an authentication key storage unit 73 for storing a secret 64-bit authentication key KS which are combined in its internal construction. As one example, this encryption module 74 can conform to Data Encryption Standard (hereinafter, DES) and be of "substitution" type. The details of "substitution" are described later in this specification.

The separator 75 separates the 64-bit data from the encrypter 72 into two sets of separated data which are the higher-order 32 bits and the lower-order 32 bits, before transferring the former to comparator 76 and the latter to linking unit 78.

The comparator 76 compares the random number from the first random number generator 71 and the separated data from the separator 75 and judges whether the two coincide.

The second random number generator 77 generates a 32-bit random number for the shared key to be used in the secret communication step only after receiving notification from the comparator 76 that the two numbers coincide.

The linking unit 78 generates 64-bit data by setting the separated data from the separator 75 as the higher-order 32 bits and the random number generated by the second random number generator 77 as the lower-order 32 bits.

The shared key temporary storage unit 79 temporarily stores the one random number sent from the second random number generator 77. Then, only after receiving notification of positive authentication from the user device 90, the shared key temporary storage unit 79 sends the stored random number, which is to say the shared key K, to encrypter 80.

The title storage unit 81 is made up of an optical disc for storing a movie or the like according to an established standard and a reproduction device for the disc. It stores the title data to be supplied to other authorized communication devices.

The encrypter 80 performs encryption $E_2$ using the second encryption algorithm. It sets 64-bit units of data read from the title storage unit 81 as plaintext and performs encryption using the shared key K sent from the shared key temporary storage unit 79 as the encryption key. As one example, this second encryption algorithm can be a substitution encryption performed for 64-bit units.

On the other hand, the user device 90 is a communication device which is authorized to receive the copy of the title from the supplier device 70 and to perform predetermined processing, with the user device 90 being composed of a sending/receiving unit 87, construction elements principally for performing the authentication step (a first random number generator 94, a linking unit 95, a decryption module 93, a separator 96 and a comparator 97) and construction elements principally for performing the secret communication step (a shared key temporary storage unit 98, a decrypter 99 and a title processing unit 89). The operation timing of these construction elements is controlled by a system controller which is not illustrated.

The sending/receiving unit 87 has the same functions as the sending/receiving unit 86.

The first random number generator 94 generates a 32-bit random number for the challenge data for the supplier device 70.

The linking unit 95 generates 64-bit data by setting the challenge data from the user device 90 as the higher order 32 bits and a random number from the first random number generator 94 as the lower order 32 bits.

The decryption module 93 is a single IC chip which performs the decryption for the authentication step and includes a decrypter 91 for performing decryption $D_1$ using the first encryption algorithm and an authentication key storage unit 92 for storing a secret 64-bit authentication key KS which are combined in its internal construction. This decryption $D_1$ is the reverse of the encryption $E_1$. Here, the authentication key KS stored by remote control reception unit 92 is the same as that stored by the authentication key storage unit 73.

The separator 96 separates the 64-bit data from the decrypter 91 into two sets of separated data made up of the higher order 32 bits and the lower order 32 bits. It sends the former to the comparator 97 and the latter to the shared key temporary storage unit 98.

The comparator 97 compares the random number from the first random number generator 94 with the separated data from the separator 96 and judges whether the two coincide.

The shared key temporary storage unit 98 temporarily stores the separated data sent from the separator 96. However, only after receiving notification of coincidence from the comparator 97 does the shared key temporary storage unit 98 send a notification of such to the supplier device 70 and send the separated data, which is to say the shared key, to the decrypter 99.

The decrypter 99 performs decryption $D_2$ according to the second encryption algorithm. In doing so, it sets the 64-bit data units which are sent from the supplier device 70 and which compose the title as plaintext end decrypts them using the shared key K sent from the shared key temporary storage unit 98 as the decryption key. This decryption $D_2$ is a reverse of the processing in encryption $E_2$.

The title processing unit 89 can be made up of a device for image reproduction of image data according to an established standard and performs the reproduction processing of the data sent from the decrypter 99.

The following is an explanation of "substitution". The explanation supposes that encryption E performs the transformation E( ) of group S1 to group S2 while the corresponding decryption performs reverse transformation D( ).

In the above case, the classification of E( ) as a substitution means that the following three conditions are satisfied.

1. $S1 \simeq S2$.
2. E( ) is a monomorphic.
3. E( ) is a epimorphic.

Here, E( ) is monomorphic because for unknown x and y in S1, the relation $x \simeq y$ is valid when $E(x) \simeq E(y)$. E( ) is epimorphic because for any unknown z in S2, there is an unknown w in S1 which satisfies $E(w) \simeq z$. It should be noted here that if E( ) is a substitution, D( ) must also be a substitution.

The following explanation deals with the above on the relationship between E( ) and D( ).

Firstly, if E( ) is epimorphic, since D( ) is the reverse transformation of E( ), for any unknown x in S1, the result D(E(x)), which is the reverse transformation using D( ) of the result E(x) when x has been converted using E(x), will be equal to x. This is to say, the following Equation 1 is satisfied.

$$x \simeq D(E(x)) \qquad \text{(Equation 1)}$$

Here, since $S1 \simeq S2$, for any unknown x in S1, the result D(x) of reverse transformation using D( ) will be an unknown in S1. Accordingly, D(x) can be substituted for x in Equation 1 to give Equation 2 below.

$$D(x) \simeq D(E(D(x))) \qquad \text{Equation 2}$$

Also, since D( ) is monomorphic, Equation 3 below can be established from Equation 2.

$$x \simeq E(D(x)) \qquad \text{(Equation 3)}$$

The above Equation 3 states that the result E(D(x)) which is given by converting the result D(x), obtained by having reverse converted an arbitrary unknown x using D( ), according to E( ) is equal to x.

As can be seen from Equations 1 and 3 above, for encryption techniques which are substitutive in nature, both decryption after encryption and encryption after decryption result in a return to the original plaintext. The encryption technique used by the present system is such a substitution.

Figure 4A:
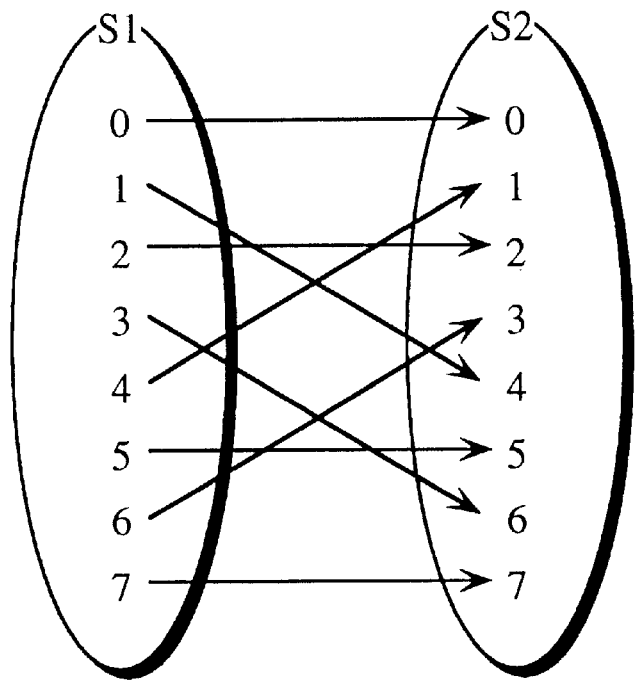
FIG. 4A shows an example of a substitutive transformation.
Figure 4B:
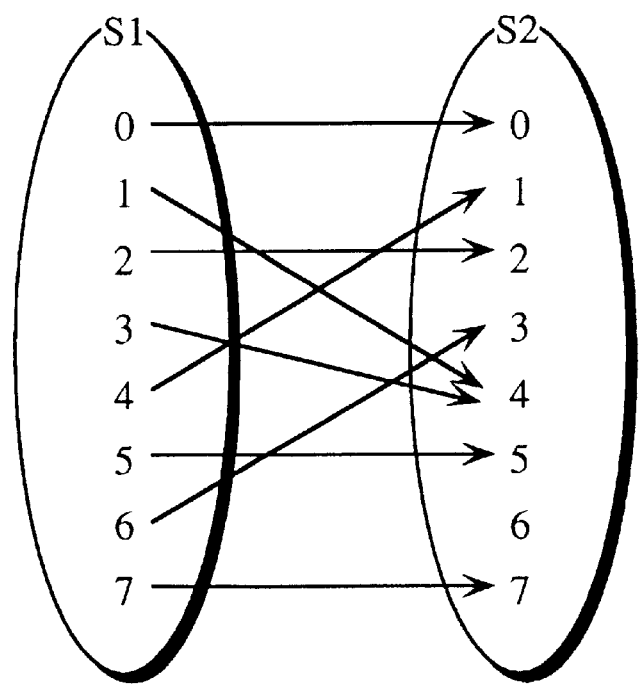
FIG. 4B shows an example of a non-substitutive transformation.

Here, in order to assist the reader's understanding, examples of substitutive transformation and non-substitutive transformation will be given, with the former being shown in FIG. 4A and the latter being shown in FIG. 4B. Here, S1 and S2 are groups based on all of the data which can be expressed using three bits, with the correspondence between elements in S1 and S2 being shown by the arrows. In the transformation shown in FIG. 4B, neither the condition of monomorphism nor that of epimorphism are satisfied.

The following is an explanation of the operation of the present system with reference to the sequence shown in FIG. 5.

FIG. 5 shows the communication sequence when a copy of a title belonging to the authorized supplier device 70 is transferred to the authorized user device 90. This drawing corresponds to FIG. 2 in the prior art section and shares many steps with the prior art example. The differences lie in encrypter and decrypter used in steps S43, S45, S48 and S50. Each step in FIG. 5 in explained below with reference to the block diagram in FIG. 3.

Steps S41, S42

First, the first random number generator 71 in the supplier device 70 generates random number R1 and transmits it as challenge data CHA1 to the user device 90 via the sending/receiving unit 86 and the network 85.

Steps S43, S44

On receiving the challenge data CHA1 via the sending/receiving unit 87, the linking unit 95 in the user device 90 obtains random number R2 from the first random number generator 94 as challenge data for the supplier device 70, and links these two as the data CHA1∥R2. It then sends this linked data (CHA1∥R2) to the decrypter 91.

The decrypter 91 sets thin linked data (CHA1∥R2) an a cryptogram and performs decryption $D_1$ according to the first encryption algorithm using the authentication key KS stored in the authentication key storage unit 92 as the decryption key. It should be noted here that while in step S23 of the prior art the linked data (CHA1∥R2) was subjected to encryption $E_1$, for the present system the linked data is subjected to decryption $D_1$, with these two processes being different.

The message $D_1$ (KS,CHA1∥R2) obtained from the decryption $D_1$ is the response data to the challenge data CHA1 and is transmitted to the supplier device 70 as the challenge data RESCHA for supplier device 70.

Step S45

On receiving this data RESCHA, the encrypter 72 sets it as plaintext and performs encryption $E_1$ according to the first encryption algorithm using the authentication key KS stored in the authentication key storage unit 73 as the encryption key. It should be noted here that while in step S25 of the prior art the data RESCHA was subjected to decryption $D_1$, for the present system the linked data is subjected to encryption $E_1$, with these two processes being different.

In this way, for plaintext CHA1, the present system performs encryption $E_1$ (step S45) after first performing decryption $D_1$ (step S43), which, as can be seen from Equation 3, returns the data to the original plaintext CHA1.

Step S46

Next, the separator 75 separates the result X1 of the encryption $E_1$ by the encrypter 72 and sends the separated data RR1 corresponding to the challenge data CHA1 to the comparator 76 and the separated data RR2 corresponding to random number R2 to the linking unit 78.

Step S47

On receiving the separated data RR1, the comparator 76 compares this separated data RR1 with the random number R1 received from the first random number generator 71 and notifies the second random number generator 77 of the comparison result.

Steps S48, S49

On receiving notification of coincidence from the comparator 76, the second random number generator 77 generates random number K for the shared key and sends it to the linking unit 78 and to the shared key temporary storage unit 79. This equates to the case when the supplier device 70 has been able to confirm that the user device 90 is authorized.

On the other hand, on receiving notification of non-coincidence from the comparator 76, the second random number generator 77 does not generate random number K and so does not perform the processing described above. This equates to the case when the supplier device 70 has not been able to confirm that the user device 90 is authorized.

On receiving the shared key K, the linking unit 78 links the shared key K with the separated data RR2 from the separator 75 and sends this linked data (RR2∥K) to the encrypter 72.

The encrypter 72 sets the linked data (RR2∥K) as plaintext and performs encryption $E_1$ according to the first algorithm using the authentication key KS stored in the authentication key storage unit 73 as the encryption key. The cryptogram $E_1$ (KS,RR2∥K) thus obtained is then sent to the user device 90 as the response data RES2 in reply to the challenge data RESCHA.

By doing so, the supplier device 70 can check the response data from the user device 90 (step S45) and generate response data to be sent to the user device 90 (step S48) using only one encryption module 74, which was not possible under the prior art.

Step S50

On receiving this data RES2, the decrypter 91 sets it as plaintext and performs decryption $D_1$ according to the first encryption algorithm using the authentication key KS stored in the authentication key storage unit 92 as the encryption key.

Step S51

Next, the separator 96 separates the result X1 of the decryption $D_1$ by the decrypter 91 and sends the separated data RRR2 corresponding to the separated data RR2 to the comparator 97 and the separated data KK corresponding to the shared key K to the shared key temporary storage unit 98.

Steps S52, S53

On receiving the separated data RRR2, the comparator 97 compares this separated data RRR2 with the random number R2 received from the first random number generator 94 and sends notification of the comparison result to the shared key temporary storage unit 98.

The shared key temporary storage unit 98 temporarily stores the separated data KK received from the separator 96. On receiving notification of coincidence from the comparator 97, the shared key temporary storage unit 98 sends notification of this to the supplier device 70 and sends the separated data KK (which is the same as the shared key K) to decrypter 99. This equates to the case when the user device 90 has been able to confirm that the supplier device 70 is authorized. This is to say, the two-way authentication is positively completed at the game time as the provision of the shared key K for the following secret communication is completed.

On the other hand, on receiving notification of non-coincidence from the comparator 97, the shared key temporary storage unit 98 does not perform transmission to the supplier device 70 or to the decrypter 99. Accordingly, the following processes described above are not performed. This equates to the case when the user device 90 has not been able to confirm that the supplier device 70 is authorized.

Steps S54, S55

On receiving notification of positive authentication from the user device 90, the shared key temporary storage unit 79 sends the previously-stored random number, which is to say shared key K, to the encrypter 80 which performs the encryption $E_2$ according to the second encryption algorithm.

The encrypter 80 sets a copy of the title stored in the title storage unit 81 as plaintext and performs encryption $E_2$ according to the second encryption algorithm, using the shared key K sent from the shared key temporary storage unit 79 as the encryption key, before transferring the encrypted result to the user device 90.

Step S56

On receiving the encrypted copy of the title, the decrypter 99 sets this as a cryptogram and performs decryption $D_2$ according to the second encryption algorithm using the shared key K sent from the shared key temporary storage unit 98 as the decryption key.

By doing so, the authentication step and secret communication step are completed as in the prior art. This is to say, if a same encryption algorithm is used as in the prior art, the authentication step and secret communication step for the present invention will be just as secure as in the prior art.

Figure 1:
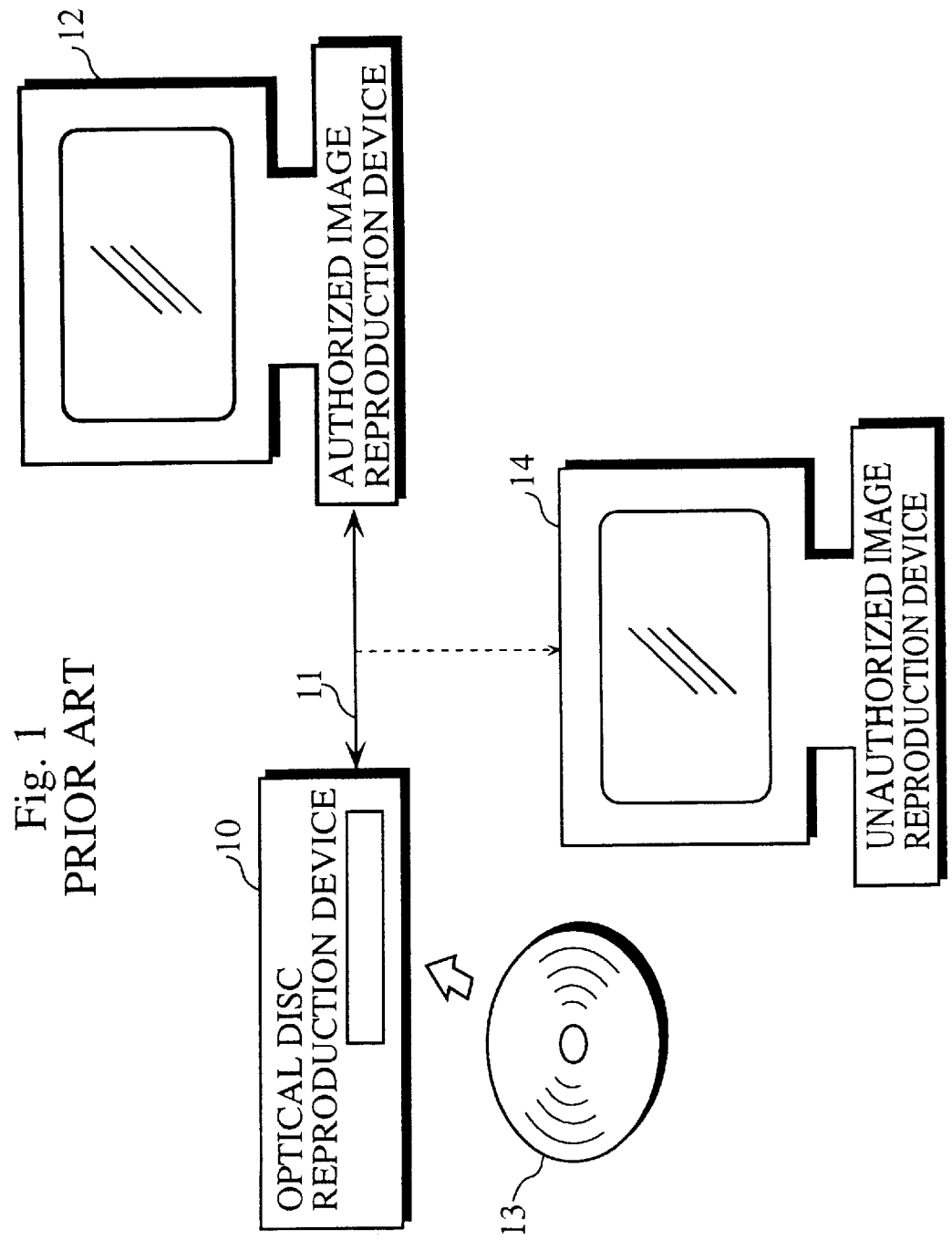
FIG. 1 shows an example construction of the communication system required for two-way authentication.
Figure 2:
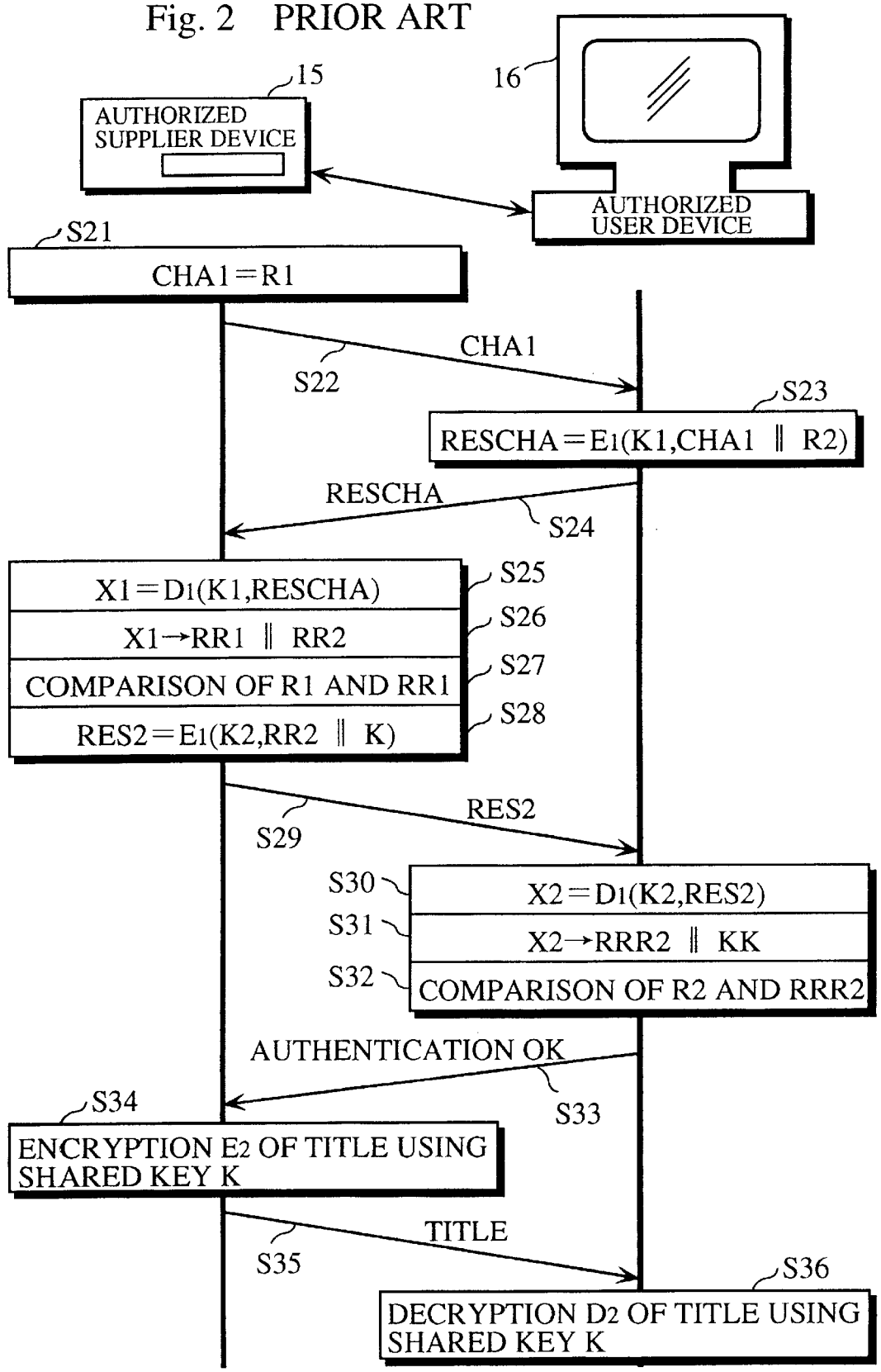
FIG. 2 shows the communication sequence when transferring a copy of a title in the possession of a supplier device to a user device, according to the prior art.

However, as can be clearly seen from FIGS. 2 and 5, the authorized supplier device 15 and the authorized user device 16 in the prior art both include an encrypter and a decrypter, while for the present system, the supplier device 70 only contains an encrypter 72 and the user device 90 only contains a decrypter 91.

The above construction is possible since the encryption algorithm used by the encrypter 72 and the decrypter 91 is a substitution and since a same encrypter (or decrypter) is used both to check the authorization of the other device and to prove the authorization of the present device.

Accordingly, for the present system, the supplier device 70 no longer needs the decrypter which was used in the prior art and the user device 90 no longer needs the encrypter which was used in the prior art, so that both devices can be made more compact.

At the same time, secrecy management for maintaining the security of two-way authentication becomes more simple with the present system. This is because the mechanism (the encryption module 74) to be kept secret for the supplier device 70 is different from the mechanism (decryption module 93) to be kept secret for the user device 90.

This is to say, should an unauthorized communication device succeed in acquiring the encryption module 74, while this unauthorized communication device may be used as an authorized supplier device 70, it cannot be used as an authorized user device 90. Similarly, while an unauthorized communication device which has acquired the decryption module 93 may be used as an authorized user device 90, it cannot be used as an authorized supplier device 70.

As a result, as one example, by performing the secrecy management of the encryption module 74 supplied to companies which manufacture the authorized supplier device 70 more securely than the secrecy management of the decryption module 93 supplied to companies which manufacture the authorized user device 90, the worst possible violation of secrecy can be avoided. This is to say, even if an unauthorized user can view titles, they will still not be able to perform the more significant violation of secrecy which is the unauthorized supply of such titles.

Second Embodiment

The following is an explanation of the two-way authentication system of challenge response format to which the second embodiment of the present invention relates. The present system features an improvement in the security of the two-way authentication over the system in the first embodiment.

Figure 6:
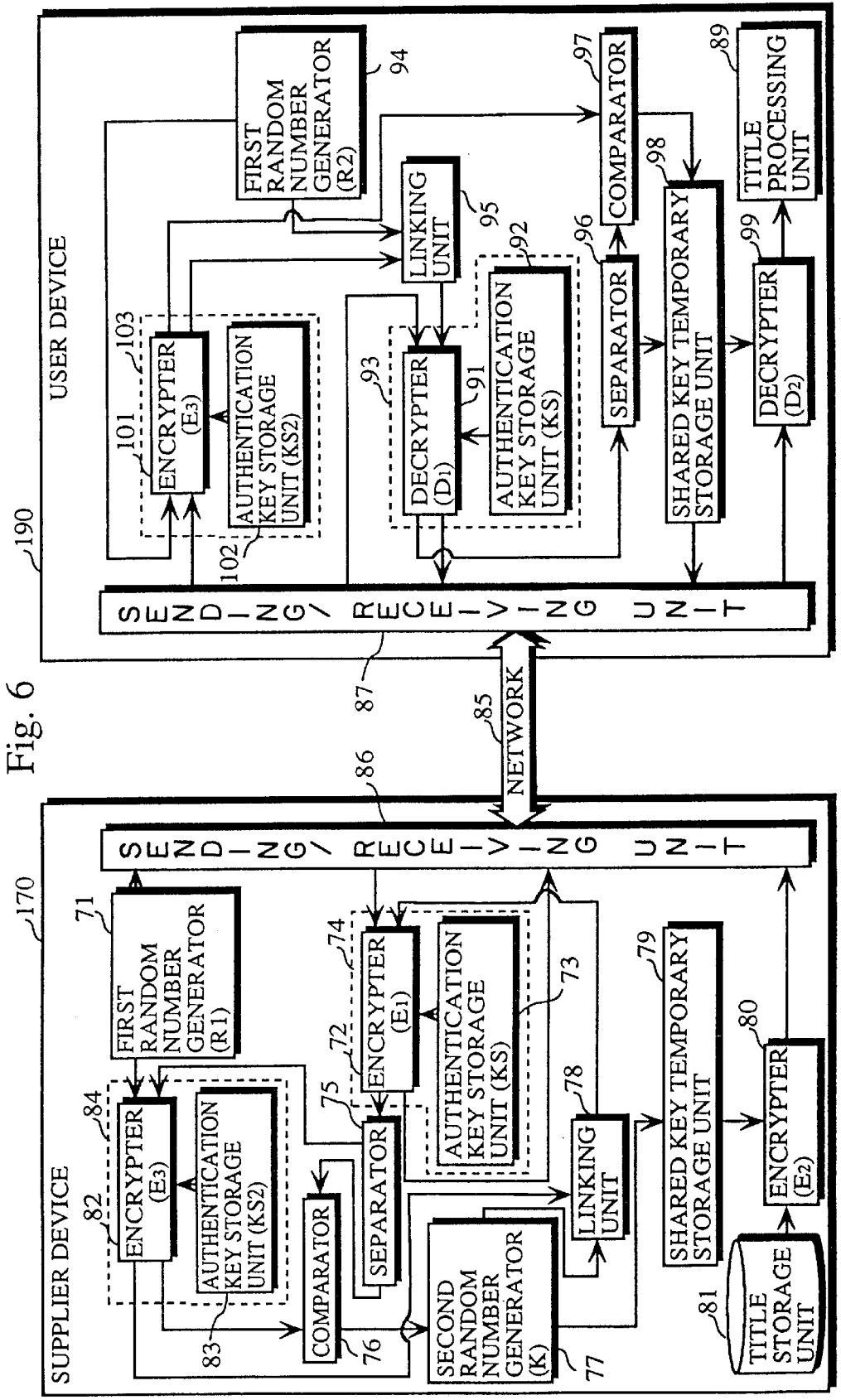
FIG. 6 is a block diagram showing the composition of the two-way authentication system in challenge response format to which the second embodiment of the present invention relates.

FIG. 6 is a block diagram showing the composition of the two-way authentication system in challenge response format to which this second embodiment of the present invention relates.

As can be seen by comparing the present figure with FIG. 3, in the present system the supplier device 170 includes a new encryption module 84 in addition to the construction elements of the supplier device 70 in the first embodiment end the user device 190 includes a new encryption module 103 in addition to the construction elements of the user device 90 in the first embodiment. It should be noted here that the construction elements in FIG. 6 which are the same as those in the system of the first embodiment have been given the same reference numerals.

The encryption modules 84, 103 are each made up of a single IC chip which performs the encryption for the authentication step, with an encrypter (respectively 82, 101) for performing encryption $E_3$ using a third encryption algorithm and an authentication key storage unit (respectively 83, 102) for storing a second authentication key KS being combined in each of their internal constructions. This is to say, the encryption module 84 and the encryption module 103 have the same construction elements, with these being different for the encryption module 74, the encrypter 80, the decryption module 93 and the decrypter 99. This encryption $E_3$ according to the third encryption algorithm can, for example, be a substitution encryption performed for 64-bit units.

As can be seen from FIGS. 3 and 6, in addition to the provision of encryption modules 84 and 103, the data transfer circuits in each of the communication devices are different in part to those in the first embodiment.

Figure 7:
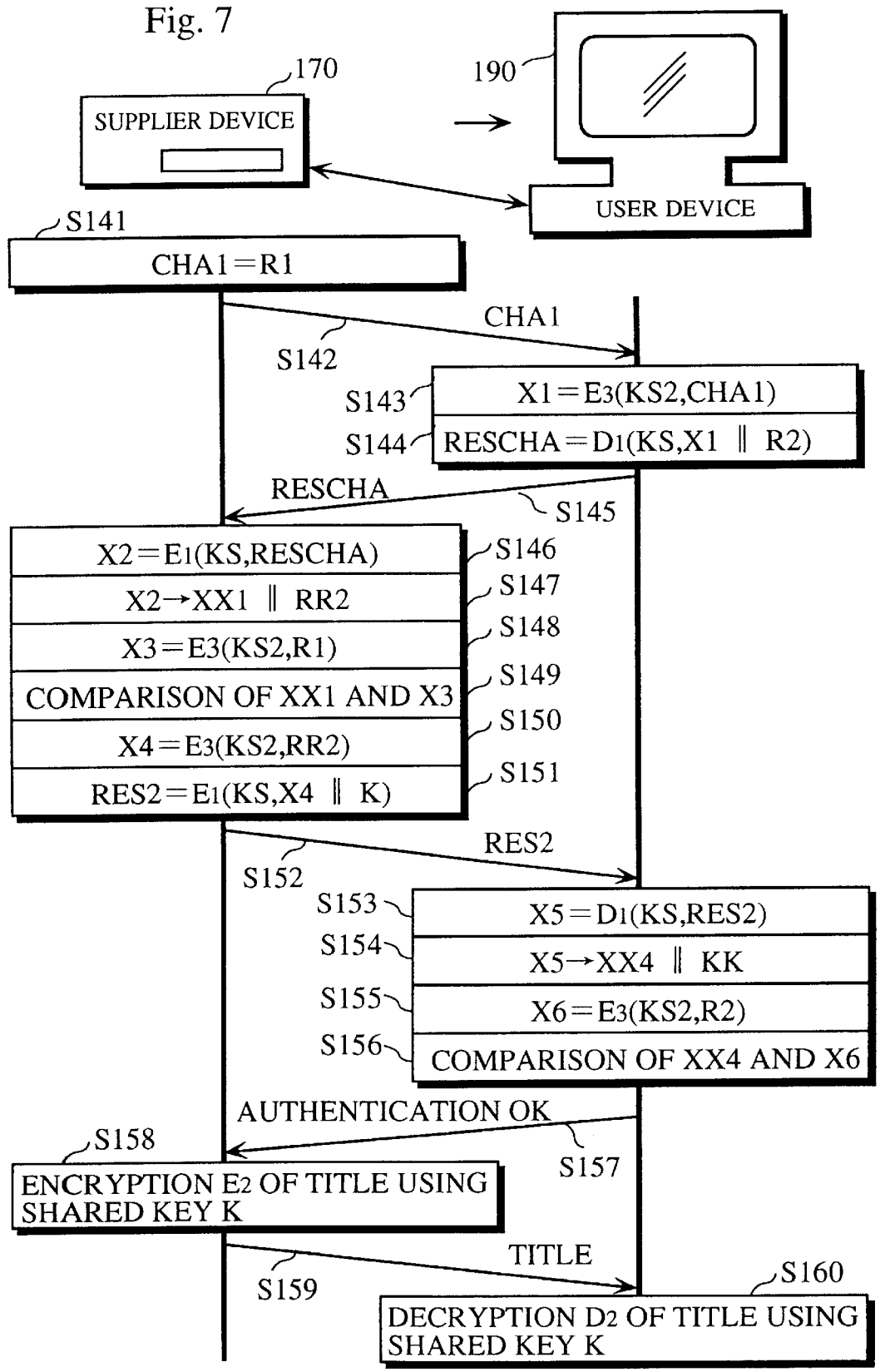
FIG. 7 shows the communication sequence when transferring a copy of a title in the possession of a supplier device to a user device, according to the second embodiment of the present invention.

The following is an explanation of the operation of the present system with reference to the communication sequence shown in FIG. 7. The explanation will focus on the differences in processing content to the first embodiment.

Steps S141, S142

First, the first random number generator 71 generates random number R1 and transmits it to the user device 190 as challenge data CHA1 for the user device 190 in the same way as in the first embodiment. However, unlike the first embodiment it also sends the random number R1 to the encrypter 82.

Step S143

The encrypter 101 receives the challenge data CHA1 from the supplier device 170.

The encrypter 101 sets this challenge data CHA1 as an cryptogram and performs encryption $E_1$ according to the third encryption algorithm using the second authentication key KS2 stored in the authentication key storage unit 102 as the decryption key.

This step is added to the sequence used in the first embodiment to improve the security of the authentication of the user device 190 by the supplier device 170.

Steps S144, S145

The first random number generator 94 generates the random number R2 an the challenge data for the supplier device 170 and sends It to the linking unit 95 in the same way as in the first embodiment, but, unlike the first embodiment, also sends the random number R2 to the encrypter 101.

The linking unit 95 links the cryptogram X1 obtained in step S143 and the random number R2 generated by the first random number generator 94.

The decrypter 91 sets the linked data (X1∥R2) from the linking unit 95 as a cryptogram and performs decryption $D_1$ according to the first encryption algorithm using the authentication key KS stored in the authentication key storage unit 92 as the decryption key. It then sends the obtained data RESCHA to the supplier device 170 as both the response data and as the challenge data.

In this way, while the challenge data CHA1 from the supplier device 170 was inputted directly into the decrypter 91 in the first embodiment, in the present system it is subjected to encryption $E_3$ by encrypter 101 before being inputted into the decrypter 91.

Step S146, S147

The processing in these steps is equivalent to the reverse of the processing in step S144 and is the same as the processing in steps S45 and S46 in the first embodiment.

This is to say, the data X2 obtained by the processing in step S146 corresponds to the linked data (X1∥R2). The separated data XX1 obtained in step S147 corresponds to cryptogram X1 and the separated data RR2 corresponds to random number R2. Note here that the separator 75 sends the separated data RR2 to the encrypter 82.

Step S148

The encrypter 82 which received the random number R1 from the first random number generator 71 in step S141 sets this random number as plaintext and performs encryption $E_3$ according to the third encryption algorithm using the authentication key KS2 stored by the authentication key storage unit 92.

This step corresponds to step S143 for the user device 190. This is to say, the cryptogram X3 obtained from encryption $E_3$ in step S148 corresponds to the cryptogram X1 obtained from encryption $E_3$ in step S143 and also corresponds to the separated data XX1 obtained from the separation in step S147.

It should be noted here that the processing in this step S148 is performed at the same time as the processing in steps S146 and S147, since it is not necessary for these steps to follow one another.

Step S149

On receiving the separated data XX1 from the separator 75, the comparator 76 compares the separated data XX1 with the cryptogram X3 received from the encrypter 82 and notifies the second random number generator 77 of the comparison result.

Step S150

Having received the separated data RR2 from the separator 75 in step S147, the encrypter 82 sets the separated data RR2 as plaintext and performs the encryption $E_3$ according to the third encryption algorithm using the authentication key KS2 as the encryption key. It then sends the resulting cryptogram X4 to the linking unit 78.

This step is added to the sequence used in the first embodiment to improve the security of the authentication of the supplier device 170 by the user device 190.

It should be noted here that the processing in thin step S150 is performed at the same time as the processing in steps S149, since it is not necessary for these steps to follow one another.

Steps S151, S152

On receiving notification of coincidence from the comparator 76, the second random number generator 77 gener-ates a random number K for the shared key and transfers it to the linking unit 78 and to the shared key temporary storage unit 79. This equates to the case when the supplier device 170 has been able to confirm that the user device 190 is authorized.

On the other hand, on receiving notification of non-coincidence from the comparator 76, the second random number generator 77 does not generate a random number K and does not perform the following processes. This equates to the case when the supplier device 170 has not been able to confirm that the user device 190 is authorized.

On receiving the shared key K, the linking unit 78 links the shared key K with the cryptogram X4 from encrypter 82 and sends this linked date (X4∥K) to the encrypter 72.

The encrypter 72 sets the linked data (X4∥K) as plaintext and performs encryption $E_1$ according to the first algorithm using the authentication key KS stored in the authentication key storage unit 73 as the encryption key. The cryptogram $E_1$(KS,X4∥K) thus obtained is then sent to the user device 90 as the response date RES2.

Steps S153, S154

The processing in these steps is the equivalent of a reverse of the processing in step S151 and is the same as the processing in steps S50 and S51 in the first embodiment.

This is to say, the data X5 obtained from the processing in step S153 corresponds to the linked data (X4∥K). In the same way, the separated data XX4 obtained by the processing in step S154 corresponds to the cryptogram X4 and the separated data KK corresponds to the shared key K.

Step S155

The encrypter 101 sets the second random number R2 which it received from the first random number generator 94 in step S144 as plaintext and performs encryption $E_2$ according to the third encryption algorithm using the authentication key KS2 stored in the authentication key storage unit 102 as the encryption key.

This step corresponds to step S150 in the supplier device 170. This is to say, the cryptogram X6 obtained from encryption $E_3$ in this step corresponds to the cryptogram X4 obtained from encryption $E_3$ in step S150 and so also to the separated data XX4 which is obtained by the separation in step S154.

It should be noted here that the processing in this step S154 is performed at the same time as the processing in steps S153, since it is not necessary for these steps to follow one another.

Steps S156, S157

The comparator 97 compares the separated data xx4 from the separator 96 and the cryptogram X6 from the encryptor 101 and informs the shared key temporary storage unit 98 of the comparison result.

The shared key temporary storage unit 98 temporarily stores the separated data sent from the separator 96. On receiving notification of coincidence from the comparator 97, the shared key temporary storage unit 98 informs the supplier device 170 of this result and sends the separated data KK (which correspond to the shared key K) to the decrypter 99. This equates to the case when the user device 190 has been able to confirm that the supplier device 170 is authorized. This is to say, the two-way authentication is positively completed at the same time as the provision of the shared key K for the following secret communication is completed.

On the other hand, on receiving notification of non-coincidence from the comparator 97, the shared key temporary storage unit 98 does not perform transmission to the supplier device 170 or to the decrypter 99. Accordingly, the following processes described above are not performed. This equates to the case when the user device 190 has not been able to confirm that the supplier device 170 is authorized.

Steps S158–S160

The processing in these steps is the same as the processing in steps S54–S56 in the first embodiment so that no explanation will be given.

By means of the above processing, a copy of a title in the possession of an authorized supplier device 15 is distributed only to authorized user devices, with eavesdropping by a third communication device during distribution being prevented.

As can be seen by comparing the sequences in FIG. 5 and FIG. 7, steps S143, S148, S150 and S155 in FIG. 7 have been added to the processing in the sequence for the first embodiment. This is to say, the supplier device 170 and the user device 190 are equipped with encryption modules 94 and 103, for performing encryption $E_3$ according to the third encryption algorithm, which were not provided to the supplier device 70 and the user device 90 in the first embodiment. Furthermore, in order to check the authorization of user devices and to prove its own authorization, the supplier device 170 uses not only the encryption module 74 but also a second encryption module 84. In the same way, in order to chock the authorization of a supplier device and to prove its own authorization, the user device 190 uses not only the encryption module 93 but also a second encryption module 103.

Due to the construction and processing described above, the system of the second embodiment has all of the advantages of the system of the first embodiment, while at the same time increasing the security of the two-way authentication process.

It should be noted here that since the encryption module 84 in the supplier device 170 is the same as the encryption module 103 in the user device 190, secrecy management for these modules should be performed more securely than for the encryption module 74 and the decryption module 93. This can be effectively realized, for example, by using a separate IC chip for each of the encryption module 84, the encryption module 103, the system controller In supplier device 170 and the system controller in user device 190. By doing so, the security of the two-way authentication process can be improved by increasing the security with which secrecy management for the encryption module 74 and the decryption module 93 is performed.

As described above, while improving the security of the two-way authentication, the present system has the advantage of enabling secrecy management for both communication devices to be achieved through secrecy management of one encryption module.

Third Embodiment

The following is an explanation of the two-way authentication system of challenge response format to which the third embodiment of the present invention relates. The present system equates to the case where a transfer procedure for an SCSI (Small Computer System Interface) which is a representative standard input/output interface is used in the authentication step and the secret communication step of the system in the first embodiment.

Figure 8:
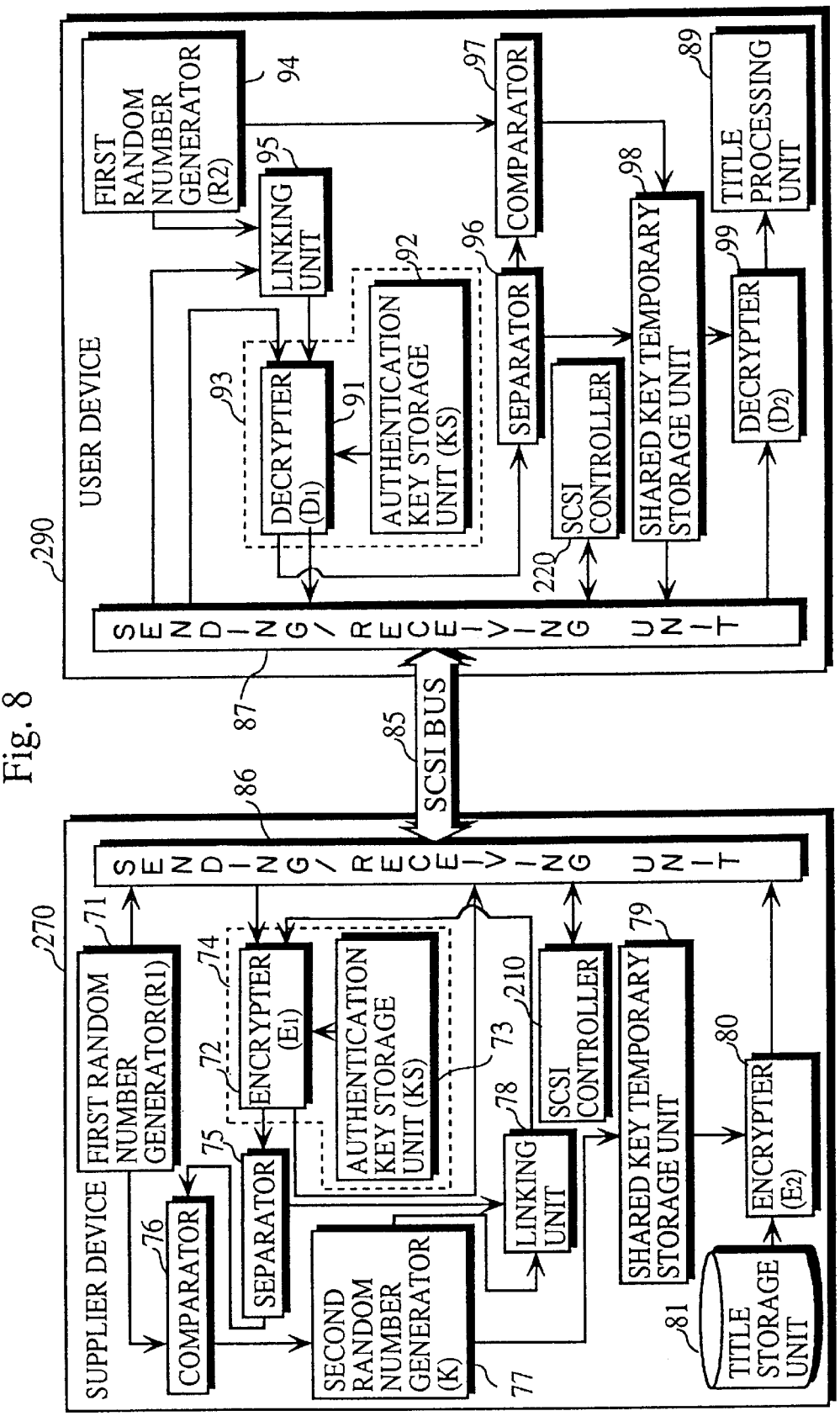
FIG. 8 is a block diagram showing the composition of the two-way authentication system in challenge response format to which the third embodiment of the present invention relates.

FIG. 8 is a block diagram showing the composition of the two-way authentication system in challenge response format to which this third embodiment of the present invention relates.

As can be seen by comparing the FIG. 3 and FIG. 8, SCSI controllers 210, 220 have respectively been added to the supplier device 70 and the user device 90 of the first embodiment. Each of SCSI controllers 210, 220 is made up of a CPU ROM, RAM and the like and executes processing which is standardized for SCSI.

In the present system, the supplier device 270 is an optical disc reproduction device, the user device 290 is a host system, the network 85 is an SCSI bus, the sending/receiving unit 86 is an I/O controller for SCSI and the sending/receiving unit 87 is a host adapter.

For SCSI, a pair of devices first occupy the bus and then perform data transfer of the object data by advancing through the four phases called "command", "data", "status" and "message". As one example, the phase transition when a first device reads data from a second device is as shown below.

1. Command phase: the first device transmits a command (READ) to the second device.
2. Data phase; the second device sends data of the designated length to the first device.
3. Status phase: the second device reports its status (the execution result of the above command) to the first device.
4. Message phase: the second device sends a message to the first device (command complete).

Here, since the definition of vendor unique commands is permitted for SCSI, the authentication command and the secret communication command are uniquely defined in the present embodiment. More specifically, the SCSI controllers 210 and 220 contain processing programs which correspond to these commands in their internal ROMS.

Figure 9:
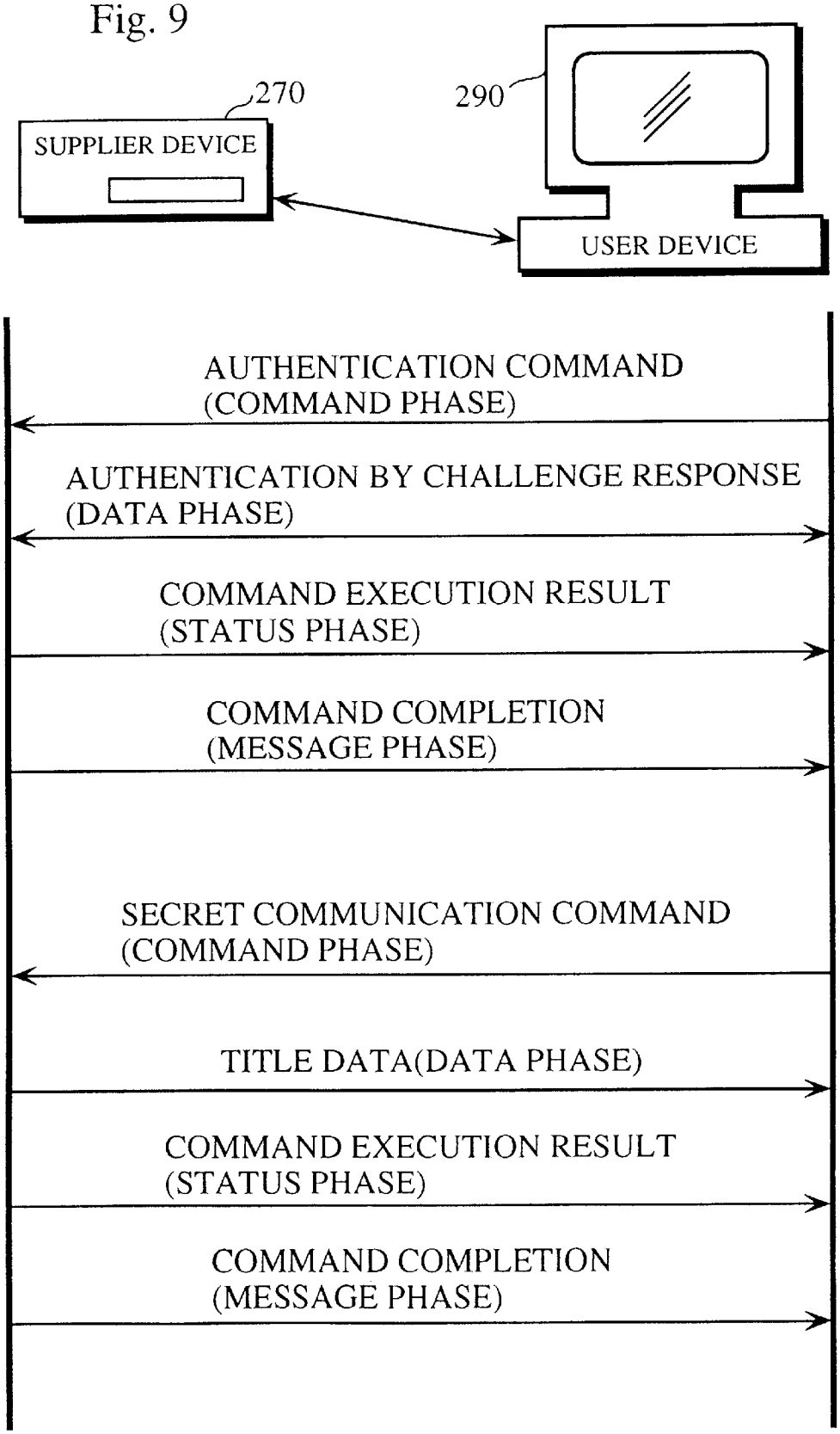
FIG. 9 shows the phase transition and data exchanges when transferring a copy of a title in the possession of a supplier device to a user device via an SCSI bus.

FIG. 9 shows the phase transition and data exchanges when transferring a copy of a title in the possession of the supplier device 270 to the user device 290 via the SCSI bus. These data exchanges are performed according to control operations by SCSI controllers 210 and 220.

Step S201 (Command Phase)

The user device 290 sends an authentication command to the supplier device 270.

Step S202 (Data Phase)

Data is exchanged between the user device 290 and the supplier device 270 according to the authentication step (steps S41–S53 in FIG. 5).

Step S203 (Status Phase)

The supplier device 270 informs the user device 290 of the execution result of the aforementioned authentication command.

Step S204 (Message Phase)

The supplier device 270 sends a message ("command complete") to the user device 290. By doing so, the two-way authentication and the establishment of the secret key K are completed.

Next, the following exchanges are performed.

Step S205 (Command Phase)

The user device 290 sends a secret communication command to the supplier device 270.

Step S206 (Data Phase)

The supplier device 270 encodes the title using the secret key K established in step S202 and sends a title data of a specified data length to the user device 290.

Step S207 (Status Phase)

The supplier device 270 informs the user device 290 of the execution result of the aforementioned secret communication command.

Step S208 (Message Phase)

The supplier device 270 sends a message ("command complete") to the user device 290. By doing so, the transfer of title data using secret communication is completed.

By means of the above procedures, the present system can perform two-way authentication and secret communication adapted to an SCSI.

The following is an explanation of the disconnect and reconnect functions with which the present system is equipped.

Under SCSI, disconnect and reconnect functions are defined to enable efficient use to be made of the SCSI bus. Here, one example is when seek time (the time taken for move the head position) becomes necessary when an optical disc reproduction device executes a command to read a large amount of data from an optical disc. In such a situation, there is a holdup in the reading of data from the optical disc reproduction device so that the SCSI bus is temporarily unused. In such a situation, the efficiency with which the SCSI bus is used can be improved by both devices temporarily disconnecting from the bus to allow use by other devices and then requesting to reconnect to the SCSI bus once the necessary preparations for data transfer have been made.

The problem with the above procedure is the danger of an unauthorized third party joining the communication when the above kind of disconnect and reconnect operations are made. Accordingly, when both devices resume communication after a reconnect, it is necessary to have both devices agree on a method for excluding unauthorized devices.

The present system overcomes the aforementioned problem by having the supplier device 270 and the user device 290 establish the following before disconnecting.

Whether to perform two-way authentication according to the procedure described above (steps S201–S204) every time a reconnect is performed, whether to perform a simplified authentication of only one of the devices or whether to not perform authentication at all.

Whether to establish a new secret key according to the procedure described above (steps S201–S204) when a reconnect is performed, or whether to perform data transfer using the same secret key as before.

More specifically, by informing the user device 290 of a procedure stored beforehand in the SCSI controller 210, both communication devices end up storing the same information about disconnects and reconnects. Accordingly, when a reconnect is performed, communication devices 270 and 290 perform such processes as authentication and the establishment of a secret key in accordance with the stored information. By doing so, inconsistencies in the exchanges between devices after a reconnect can be avoided and the reconnect can proceed smoothly.

The two-way authentication system of the present invention has been explained using the preceding three embodiments, although it should not be construed as being limited to such. Some examples of possible modifications are listed below.

1. While the first embodiment described that the encryption $E_1$ according to the first encryption algorithm was standardized for DES, the present invention is not limited to such an encryption method.

Figure 10:
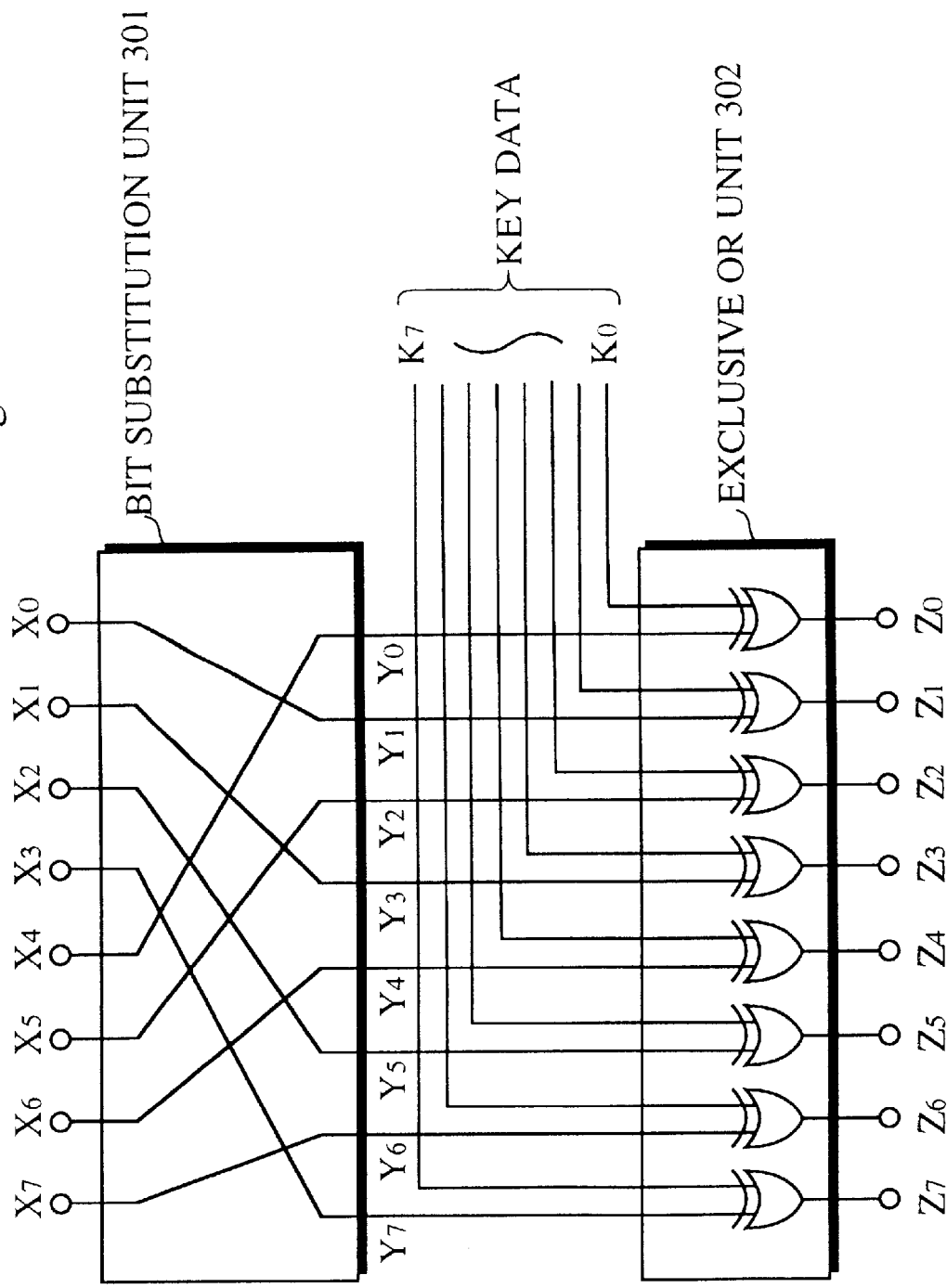
FIG. 10 shows an example construction of an 8 bit data encrypter which is substitutive in nature.

FIG. 10 shows an 8 bit data encryptor which is substitutive in nature. Here, the 8-bit plaintext X is converted into the intermediate data Y by bit substitution unit 301, before the exclusive OR unit 302 performs exclusive OR operations for each bit of intermediate data Y and the key data K which converts it into the cryptogram Z. As one example, when the plaintext X is "11110000" and the key data is "01010101" the intermediate data Y becomes "01010101" and the cryptogram z becomes "00000000".

Complex encrypters of a substitutive nature can be produced by setting the combination of the above kinds of bit substitution unit and exclusive OR unit an one block and connecting a plurality of the same kind of blocks in series or in parallel. A decrypter is produced by connecting a bit substitution unit 301 and an exclusive OR unit 302 in reverse order.

In the above embodiments, the encryption $E_2$ according to the second encryption algorithm and the encryption $E_3$ according to the third encryption algorithm wore described as being substitutive encryption performed for 64-bit unit data, although the present invention is not limited to this kind of encryption. In fact, provided the first encryption algorithm satisfies the Equations 1 and 3 given above, the second and third encryption algorithms only need to satisfy Equation 1.

2. In the first embodiment, the fundamental procedure used by each communication device in authenticating the other was the generation of a random number to be sent as challenge data, the encryption (or decryption) of the response data which comes in reply and the comparison of the generated random data with the encrypted (decrypted) result, although the present invention is not limited to this procedure.

As one example, a random number may be encrypted (or decrypted) before being sent to the other device, with the response data then being compared to this random number. This procedure is equally secure.

3. In the second embodiment, an identical encryption module (84, 103) was provided in each of the supplier device 170 and the user device 190 to increase the security of the two-way authentication, although the present invention is not limited to this particular construction.

As one example, an encryption module may be provided to the user device 190, with a corresponding decryption module being provided to the supplier device 170. By strictly controlling both of these modules, an increase in the security of two-way authentication can be achieved.

4. In the third embodiment, the procedure stored beforehand in the SCSI controller 210 in the supplier device 270 was given priority in determining the procedure to be used after a reconnect, although the present invention need not be limited to such, so that a procedure stored in the user device 290 may be given priority.

5. The system of the third embodiment was described as corresponding to the system of the first embodiment which has been adapted to SCSI standard, although the present invention is not limited to this. The system of the second embodiment may similarly be adapted to SCSI standard. Also, the systems of the second and third embodiments may use a different communication protocol to SCSI standard, such as a communication protocol which includes a command phase and a data transfer phase.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A communication apparatus for performing two-way authentication in challenge response format with another communication apparatus on a communication channel, the communication apparatus comprising:

first authentication key storage means for storing a first authentication key which is only provided to authorized communication apparatuses;

first data converting means for performing a data conversion determined by the first authentication key, the data conversion being based only on a single algorithm, wherein an inverse conversion for the data conversion exists and subjecting a plaintext to the data conversion and the inverse conversion in any order restores the plaintext to an original form;

authenticating means for authenticating the other communication apparatus using communication in the challenge response format and the data conversion performed by the first data converting means; and proving means for proving an authorization of a present communication apparatus using communication in the challenge response format and the data conversion performed by the first data converting means.

2. The communication apparatus of claim 1, wherein the authenticating means includes:

a challenge data transmitting unit for generating a random number and transmitting the random number to the other communication apparatus as challenge data; and a verifying unit for receiving response data from the other communication apparatus, for converting the response data using the first data converting means, for comparing the converted response data with the generated random number and for notifying the other communication apparatus of an authentication of the other communication apparatus if the converted response data coincides with the random number, wherein the proving means receives the challenge data from the other communication apparatus, converts the challenge data using the first data converting means and transmits the converted challenge data to the other communication apparatus as response data.

3. The communication apparatus of claim 2 for performing data transfer after two-way authentication has been achieved, the communication apparatus further comprising;

shared key obtaining means for obtaining a shared key according to a certain procedure if both the present communication apparatus and the other communication apparatus have been authenticated by each other;

second data converting means for performing a data conversion determined by the shared key; and data transferring means for performing the data transfer of the converted data using the second data converting means.

4. The communication apparatus of claim 3, wherein the first authentication key storage means and the first data converting means are combined in one integrated circuit.

5. The communication apparatus of claim 4, further comprising:

second authentication key storage means for storing a second authentication key which is only provided to authorized communication apparatuses;

third data converting means for performing a date conversion determined by the second authentication key, wherein the second authentication key storage means and the third data converting means are combined in one integrated circuit, wherein the authenticating means authenticates the other communication apparatus using the first data converting means and the third data converting means, and the proving means proves an authorization of a present communication apparatus using the first data converting means and the third data converting means.

6. The communication apparatus of claim 4, wherein the communication apparatus includes two communication states called a command phase and a data transfer phase and the communication apparatus further comprises:

authentication controlling means for controlling the authenticating means, the proving means, and the shared key obtaining means during the command phase to have the authenticating means authenticate the other communication apparatus, to have the proving means prove the authorization of the present communication apparatus and to have the shared key obtaining means obtain the shared key;

data transfer controlling means for controlling the data transferring means during the data transfer phase to have the data transferring means transfer the converted data.

7. The communication apparatus of claim 6, wherein the communication apparatus includes a disconnect function which is used for temporarily closing an established connection to make the communication channel available and a reconnect function which is used for reopening the temporarily closed connection, the communication apparatus further comprising:

deciding means for exchanging information with the other communication apparatus and storing a common procedure before a disconnect is performed for an established connection, wherein the common procedure includes information as to whether to re-execute an authentication by the authenticating means, whether to re-execute proving by the proving means, whether to re-execute an obtaining of the shared key by the shared key obtaining means, and whether to re-execute a data transfer by the data transferring means.

8. A communication system which is made up of a supplier apparatus that supplies information and a user apparatus that uses the information and which performs two-way authentication in challenge response format on a communication channel, wherein the supplier apparatus comprises:

first authentication key storage means for storing a first authentication key which is only provided to authorized supplier apparatuses;

first encrypting means for performing an encryption determined by the first authentication key, wherein the encryption is based only on a single algorithm, wherein an inverse conversion for the data conversion exists and subjecting a plaintext to the data conversion and the inverse conversion in any order restores the plaintext to an original form and wherein the first encrypting means is combined with the first authentication key storage means in one integrated circuit;

authenticating means for authenticating the user apparatus; and proving means for proving an authorization of the supplier apparatus using the communication in the challenge response format and the encryption performed by the first encrypting means, and the user apparatus comprising:

user first authentication key storage means for storing the same first authentication key as the first authentication key storage means in the supplier apparatus;

first decrypting means for performing a decryption determined by the first authentication key, wherein the decryption is a reverse conversion of the encryption performed by the first encrypting means in the supplier apparatus and wherein the user first authentication key storage means and the first decrypting means are combined in one integrated circuit;

user authenticating means for authenticating the supplier apparatus using communication in challenge response format and the decryption performed by the first decrypting means; and user proving means for proving an authorization of the user apparatus using the communication in challenge response format and the decryption performed by the first decrypting means.

9. The communication system of claim 8, wherein the supplier apparatus further comprises:

shared key obtaining means for generating a random number as a shared key, for encrypting the shared key using the first encrypting means, and for transmitting a cryptogram obtained from the encryption to the user apparatus;

second encrypting means for performing an encryption determined by the shared key; and information transmitting means for encrypting information using the second encrypting means and transmitting the encrypted information to the user apparatus, only after receiving a notification of authentication from the user apparatus, wherein the user apparatus further comprises:

user shared key obtaining means for decrypting the cryptogram sent from the supplier apparatus using the first decrypting means if the authenticating means has authenticated the supplier apparatus and for storing a plaintext obtained from the decryption as the shared key;

second decrypting means for performing a decryption determined by the shared key, wherein the decryption is a reverse conversion of the encryption performed by the second encrypting means in the supplier apparatus; and information receiving means for receiving the encrypted information transmitted by the information transmitting means of the supplier apparatus and decrypting the encrypted information using the second decrypting means.

10. The communication system of claim 9, wherein the supplier apparatus further comprises:

second authentication key storage means for storing a second authentication key which is only provided to supplier apparatuses which have been authorized; and third encrypting means for performing an encryption determined by the second authentication key, wherein the third encrypting means and the second authentication key storage means are combined in one integrated circuit, wherein the authenticating means authenticates the user apparatus using the first encrypting means and the third encrypting means, and the proving means proves an authorization of the supplier apparatus using the first encrypting means and the third encrypting means, and the user apparatus further comprises:

user second authentication key storage means for storing the same second authentication key as the second authentication key storage means in the supplier apparatus;

user third encrypting means for performing the same encryption as the third encrypting means in the supplier apparatus, wherein the user third encrypting means and the user second authentication key storage means are combined in one integrated circuit, wherein the user authenticating means authenticates the supplier apparatus using the first decrypting means and the user third encrypting means, and the user proving means proves an authorization of the user apparatus using the first decrypting means and the user third encrypting means.

11. The communication system of claim 9, wherein the supplier apparatus includes two communication states called a command phase and a data transfer phase, and further includes a disconnect function which is used for temporarily closing an established connection to make the communication channel available and a reconnect function which is used for reopening the temporarily closed connection, wherein the supplier apparatus further comprises:

authentication controlling means for controlling the authenticating means, the proving means, and the shared key obtaining means during the command phase to have the authenticating means authenticate the user apparatus, to have the proving means prove the authorization of the supplier communication apparatus and to have the shared key obtaining means obtain the shared key;

data transfer controlling means for controlling the information transmitting means during the data transfer phase to have the information transmitting means perform information transmission;

deciding means for exchanging information with the user apparatus and storing a common procedure before a disconnect is performed for an established connection, wherein the common procedure includes information as to whether to re-execute an authentication by the authenticating means, whether to re-execute proving by the proving means, whether to re-execute an obtaining of the shared key by the shared key obtaining means, and whether to re-execute the information transmission by the information transmitting means, wherein the user apparatus includes two communication states called a command phase and a data transfer phase, and further includes the same disconnect function and reconnect function as the supplier apparatus, wherein the user apparatus further comprises:

authentication controlling means for controlling the authenticating means, the proving means, and the shared key obtaining means during the command phase to have the authenticating means authenticate the supplier apparatus, to have the proving means prove the authorization of the user communication apparatus and to have the shared key obtaining means obtain the shared key;

data transfer controlling means for controlling the information receiving means during the data transfer phase to have the information receiving means perform information reception:

deciding means for exchanging information with the user apparatus and storing a common procedure before a disconnect is performed for an established connection, wherein the common procedure includes information as to whether to re-execute an authentication by the authenticating means, whether to re-execute proving by the proving means, whether to re-execute an obtaining of the shared key by the shared key obtaining means, and whether to re-execute the information reception by the information transmitting means.

12. A method of performing two-way authentication and distribution of a secret key in a communication system which is made up of a supplier apparatus that supplies information and a user apparatus that uses the information, the method comprising:

a first step in which the supplier apparatus generates a first random number and transmits the first random number to the user apparatus;

a second step in which the user apparatus receives the first random number, generates a second random number, combines the first random number and the second random number into a first cryptogram, decrypts the first cryptogram, and transmits a first plaintext obtained from the decryption to the supplier apparatus;

a third step in which the supplier apparatus receives the first plaintext, encrypts the first plaintext, wherein an inverse conversion for the encryption exists and subjecting a plaintext to the encryption and the inversion conversion in any order restores the plaintext to original form, divides a second cryptogram obtained from the encryption into first data and second data, the first data corresponding to the first random number and the second data corresponding to the second random number, compares the first random number with the first data, generates a third random number as the secret key if the first data coincides with the first random number, combines the third random number and the second data, encrypts a second plaintext which is obtained from combination using a same encryption method as when encrypting the first plaintext, and transmits to the user apparatus a third cryptogram obtained by encrypting the second plaintext; and a fourth step in which the user apparatus receives the third cryptogram, decrypts the third cryptogram using the same decryption method as when decrypting the first cryptogram, divides a third plaintext obtained by decrypting the third cryptogram into third data and fourth data, the third data corresponding to the second data and the fourth data corresponding to the third random number, compares the third data with the second random number, and, if the third data coincides with the second random number, notifies the supplier apparatus of a coincidence of the third data and the second random number and holds the fourth data as the secret key.

13. A digital communication system for transmitting titles such as movies and multi media works comprising:

a supplier device for transmitting and receiving data over the digital communication system, a plurality of user devices for transmitting and receiving data over the digital communication system, each user device including a first encryption module for challenge and response, said module having a first encrypter containing a first data conversion algorithm, wherein an inverse conversion for the first data conversion algorithm exists and subjecting a plaintext to the first data conversion algorithm and the inverse conversion in any order restores the plaintext to an original form, said user device further comprising a third encrypter containing a third data conversion algorithm; and a transmission apparatus for transmitting data between the supplier and the user devices.

14. The digital communication system of claim 13 wherein the first encrypter containing the first data conversion algorithm is used by a first user device to authenticate the validity of a supplier device on the system, and wherein the first encrypter containing the first data conversion algorithm is also used by the first user device to prove its validity to the supplier device.

15. The digital communication system of claim 13 wherein the first encryption module includes a first authentication key of roughly 64 bits stored in a first authentication key storage unit, wherein said first authentication key is utilized by the first encrypter to encrypt challenge and response data.

16. The digital communication system of claim 13 wherein the third encrypter containing the third data conversion algorithm is used by the first user device to decrypt titles received from the supplier device through the transmission apparatus.

17. The digital communication system of claim 13 wherein the first encrypter comprises a non volatile IC chip on which is stored the first data conversion algorithm.

18. The digital communication system of claim 13 wherein the supplier device comprises a second encryption module for challenge and response, said second encryption module having a second encrypter containing a second data conversion algorithm that is substitutive in nature, the supplier device further comprising a fourth encrypter containing a fourth data conversion algorithm.

19. The digital communication system of claim 18 wherein the second encrypter containing the second data conversion algorithm is used by the supplier device to authenticate the validity of the first user device, and wherein the second encrypter containing the second data conversion algorithm is also used by the supplier device to prove its validity to the first user device.

20. The digital communication system of claim 18 wherein the second encryption module includes a second authentication key of roughly 64 bits stored in a second authentication key storage unit, wherein the second authentication key is utilized by the second encrypter to encrypt challenge and response data.

21. The digital communication system of claim 18 wherein the fourth encrypter containing the fourth data conversion algorithm is used by the supplier device to encrypt titles transmitted to user devices through the transmission apparatus.

22. The digital communication system of claim 18 wherein the second data conversion algorithm is stored in a non volatile IC chip.

* * * * *